Patented Mar. 9, 1937

2,073,342

UNITED STATES PATENT OFFICE 2,073,342

CONVERSION PROCESS

Walter H. Hart, Winnetka, Ill., assignor to Stein, Hall Manufacturing Company, Chicago, Ill., a corporation of Delaware No Drawing. Application July 17, 1934, Serial No. 735,581

3 Claims. (Cl. 127—32)

This invention relates to conversion processes and products, and particularly to the conversion of the starchy component of starch and protein containing cereals to produce converted products, commercial dextrin, and adhesives. By the term "cereals" as hereinafter used in the specification and claims, I mean to include all grains and other vegetable substances containing substantial amounts of starch such as corn, wheat, rye, rice, peas, beans, and similar substances in either milled or unmilled condition.

It should be understood that the term "commercial dextrin" does not necessarily mean chemically pure dextrin but is a term generally used to designate the mixture—of starch, starch isomerides, and reducing sugars along with other substances—that is obtained by breaking or partially breaking down or hydrolyzing or converting starch or cereal of high starch content by means of heat, acids, acid salts, enzymes, combinations of these means, or other catalysts.

Ordinarily the dry commercial dextrin or British gums are made by roasting substantially pure starch, either with or without small amounts of acid or other catalysts, until a product of the desired color, solubility, viscosity and other physical characteristics is obtained.

The wet converted liquid dextrins and dextrin pastes are usually made by cooking starch with water and a small amount of some acid or other catalyst, or else by treating gelatinized starch with some enzyme, such as malt diastase or other catalyst.

As I understand it, the hydrolysis of starch is a catalytic reaction and I use the words catalytic and catalytic reaction and catalyzer in the following description in their broadest sense.

In accordance with one of the common methods for manufacturing dextrin from starch, the starch is placed in a converter and is converted by heat in the presence of a catalyst such as, for example, hydrochloric acid which is sprayed on to the starch in a water solution. However, when moisture is added in a similar manner to cereals that have been milled to some extent, a tough, sticky dough or gel ordinarily forms which more or less envelops the cereal mass and prevents contacting of the starch catalyzer or converting agent with the starch and further makes mixing and subsequent processing to obtain a dry powdered product difficult, if not impossible.

Formerly, it had proven very difficult to satisfactorily dextrinize cereals without first removing certain of the proteins, fibre and fats naturally present in these cereals, due to the fact that these substances interfered with proper conversion of the starch into dextrins or other conversion products. However, the prior art limitation of the necessity of first removing the proteins, fats, and fibre from the cereal before dextrinizing, as well as the inherent undesirable gel-forming characteristic of the finely ground material when wet, as mentioned above, as well as other difficulties, were successfully overcome by the conversion processes disclosed in the Hans F. Bauer Patent 1,938,574, issued December 12, 1933, and in his application Serial No. 552,996, filed July 24, 1931. The essence of the inventions in these Bauer processes is the treatment of the cereal in either milled or substantially unmilled condition with a chemical or chemicals that have a liquefying or degelling action on certain of the components of the cereal normally forming a dough or gel when in the presence of moisture. These chemicals comprise a large number of compounds, the majority of which are salts or addition compounds of sulphurous acid, such as, for example, sodium sulphite. The conversion step of these processes is usually carried out in the presence of a catalyst such as hydrochloric acid, and is accompanied by an application of heat. The liquefying, degelling or gel inhibiting agents used insure the penetration of the catalyst into the cereal and thereby effect speedy and efficient conversion. One of the characteristic features of these processes is that the treatment of the cereal prior to conversion is carried out under substantially dry conditions at least not under liquid conditions.

The present invention is related to the Bauer processes, supra, in that it deals in general with conversion processes and products, and particularly those for the conversion of protein and starch-containing cereals in which the gel-forming problem may be present. It distinguishes from these Bauer processes in that new methods are involved for overcoming the conversion inhibiting conditions, and in that the processes of the present invention, as regards the treatment of the cereal prior to conversion, are of a substantially wet type. While any of the cereals mentioned above may be advantageously used, the present invention has been found particularly adaptable to corn and similar types of cereals.

An object of my invention is to provide an improved process for dextrinizing cereals or otherwise modifying their starch content in such manner that it is unnecessary to first remove the fibre and proteins from the cereal.

Another object of my invention is to provide a process for converting the starch content of corn or similar types of grain in such a manner that the potentially gel-forming or conversion-inhibiting proteins present in the grain will not interfere with the conversion.

A further object of my invention is to produce an improved dextrin or other converted product from cereals.

In accordance with my invention the cereal, which is to be converted, is coarsely broken and then treated with a protein modifying or softening substance in liquid form, usually an aqueous solution. After this treatment the cereal and liquid mixture or suspension is dried and the resultant mass ground into a fine powder. This dried powder will contain an amount of the protein modifying substance that was previously added. This substance has the property of inhibiting gel-forming and the like when the liquid conversion catalyst is added, so that subsequent conversion of the dried powder into dextrin or other conversion products, or adhesive products, can be easily effected. The conversion may be carried out by treating the dry cereal powder with any of the conversion catalysts, such as, for example, hydrochloric acid.

It is also within my invention to only partially remove the liquid protein solution and then convert the cereal material in the presence of a converting agent and/or additional degelling agents and/or protein satisfying agent as desired. The treated cereal material may then be dried and ground to a flour like condition.

If desired, the dry cereal powder may be used as such for any suitable purpose without being dextrinized or otherwise converted. In most cases, however, it is believed that the greatest benefits of my invention will be realized by subsequent conversion of the cereal powder, since the products that may be produced thereby are numerous and the preliminary chemical treatment, which I employ in preparing the powder, enables the subsequent conversion operations to be performed with ease.

I have further discovered as a part of my invention that one or more of the gel-inhibiting agents disclosed in the Bauer patent, supra, may be incorporated in the treated cereals, for example, in the dried powder mentioned above, just prior to conversion, to further facilitate the conversion process. Although it is not necessarily essential to use these additional conversion products to obtain satisfactory results, they may be used in order to facilitate the conversion process. Another way of obtaining generally similar results is to employ a more concentrated solution of the protein modifying substance in the preliminary treating step.

Still another modification of my invention comprises, first treating the cereal grains in the manner described above, that is, subjecting them to the protein softening chemical solution, reducing the mass to a dry powder and then adding one of the gel-inhibiting chemicals, such as a sulphite salt, and a protein satisfying agent such as those disclosed in the copending application of Hans F. Bauer and Herbert S. Gardner, Serial No. 81,270, filed May 22, 1936, with or without subsequent conversion.

The combination of these three main steps, namely, (1) treating the cereal with a liquid protein softening chemical and drying and grinding the mixture, (2) adding a gel-inhibiting salt, and (3) adding a protein-satisfying agent, effects a process in which all of the gel-forming and conversion problems are fully met. The net result of this combination process is a speedy and efficient conversion of the cereals.

As an illustrative example of one embodiment of my invention, the following description of a conversion process using corn is given:

A suitable amount of corn in the form of whole grains is first cracked sufficiently to separate out the oil-containing germ, which is then removed from the rest of the cracked grain. The cracked and degerminated grains are then allowed to steep in an aqueous sulphurous acid solution until the fibre and protein constitutents are softened and loosened with regard to the rest of the grain. These first two steps may, if desired, be modified to the extent that the whole corn grains are steeped in the sulphurous acid first and then ground or otherwise treated to remove the oil-containing germ. The third step is to grind the sulphurous acid-corn mixture, for example, either in a roll mill or an attrition mill. After the germ has been removed and the corn grains ground, the ground mixture may, if desired, be passed over fine screens to separate out certain of the fiber, although this last step is not essential.

The ground material, supra, is now dried. The drying operation may be carried out in an ordinary starch-drying room. A convenient procedure is to siphon off the water from the ground corn and permit the latter to settle for a time. The partially dehydrated ground corn is then put in trays, and stored in the drying room. The temperature of this room may vary from 150° F. to 250° F. A precaution to be taken is that the temperature is not allowed to reach the gelatinization point of the corn. After the corn has been dried in this manner, the corn cake or mass which is formed is finely ground into a flour.

It is also, of course, within my invention to treat the cereal in a substantially unmilled state in the liquid containing the protein softening substance, for example, sulphurous acid, subsequently drying the cereal in this condition and finally reducing it to a flour form when in the dry.

The dry flour may now be dextrinized or otherwise converted preferably in the presence of one of the common catalytic or conversion acids, for example, by spraying hydrochloric acid in the form of a fine mist into the flour. As already pointed out, additional gel-inhibiting agents and protein satisfying agents may be added also.

As will be noted from the above description, the sulphurous acid which was used in the first part of the process for steeping the corn, was not neutralized and therefore a part of it remained in the dried flour. I have found that the presence of this sulphurous acid in the flour facilitates the conversion of the flour when treated with one of the common conversion catalysts or heated with or without the catalyst. The speed and efficiency of this conversion process is more or less dependent upon the amount of sulphurous acid present in the flour during the conversion. The conversion process can therefore be governed largely by regulating the amount of sulphurous acid or the concentration thereof in which the cereal is originally treated.

As suggested above, if it is desired to further speed up the conversion process, the gel-inhibiting properties of the sulphurous acid may be augmented by adding to the corn flour, just previous to the conversion, one or more of the gel-inhibiting compounds disclosed in the Bauer patent, supra.

As fully explained in the Bauer and Gardner pending application, supra, it has been found that by adding one or more of the compounds disclosed in that application, that the catalyst absorbing capacity of the protein content of the cereal is satisfied. If these compounds are not added, this absorbing capacity must be satisfied by some of the hydrochloric acid or other catalyst conversion agent, with the result that an insufficient amount of catalyst will remain for adequately converting the starch content of the cereal being treated. By the addition, however, of one or more of these protein-satisfying agents, practically the full amount of the catalyst is made available for converting the starch, with the result that a speedy and efficient conversion is effected. Here again, as far as the successful operation of my invention is concerned, it is not essential to have present a protein-satisfying agent, but such an agent, I have found, will effectively cooperate with the other steps of my process described above and will further facilitate conversion of the cereal into dextrin or other conversion products.

A specific example of the application of my invention to a process in which the three protein softening, gel-inhibiting and protein-satisfying means, described above, may all be cooperatively associated, is as follows: Degerminated corn is steeped in sulphurous acid or one having similar properties of such concentration that some of the sulphurous acid remains in the corn after the corn has been removed from the acid and has been dried, and ground. To approximately 1000 pounds of the thus treated corn is added approximately 2 pounds of the gel-inhibiting sodium sulphite salt. This mixture is heated to approximately 120° F. and to it is added 15 pounds of 18° Baumé hydrochloric acid diluted down to 9° Baumé, and 85 grams of copper chloride. The temperature is then raised to the usual conversion temperature and maintained until the desired amount of conversion is obtained.

As disclosed in the Bauer Patent No. 1,938,574, the degelling or gel-inhibiting agents which may be used in my process are derivatives of hydrogen sulphide or addition compounds of sulphurous acid or reduced derivatives of sulphurous acid, such compounds being, for example, sulphur dioxide, sodium bisulphite, sodium metabisulphite, sodium pyrosulphite, sodium hydrosulphite and its organic addition compounds with aldehydes and ketones, sodium formaldehyde sulphoxylate, hydrogen sulphite, sodium sulphite, ammonium polysulphide, sodium xanthate, potassium ethyl xanthate, sodium diethyl dithio carbamate, thiocresol, thionaphthol and sodium tri-thiocarbonate.

The protein satisfying agents as disclosed in the pending application of Bauer and Gardner may be, for example, copper chloride, oxalic acid, formaldehyde, chlorine, or certain of the degelling or gel-inhibiting agents already noted. The starch converting acids or catalyzers which may be used would include those well known in the art, such as hydrochloric acid, nitric acid, chronic acid, chlorine, as well as others.

In carrying out the conversion step of my process, I preferably operate with a percentage of water well below the maximum absorption point of the dry flour or cereal mass. Even such lower percentages of moisture cause, however, a gelling action of the new particles and have a deterrent effect, as already pointed out, upon the action of the starch conversion agent. In general, in the use of the term "dry" therefore, in connection with the conversion step, I mean to refer to any condition of the cereal below that condition in which sufficient water is present to have the flour or cereal mass in a water liquid state, or any point below the maximum absorption point of the flour or cereal under treatment. It is possible, of course, to carry out this conversion step under conditions in which sufficient water is not present to cause the formation of a gel; in other words, under conditions avoiding gel formation.

While my invention is particularly adaptable to corn and like cereals, it may easily and satisfactorily be applied to practically any of the cereals normally used in the conversion processes.

It is to be understood that my invention is not limited to the specific examples given hereinabove for purposes of illustration, but is susceptible to various modifications and changes, the scope of which is to be limited only by the prior art and the appended claims.

What I claim as new is:

1. The method of converting starch in cereal containing starchy and protein ingredients comprising degerminating the cereal, steeping the degerminated cereal in a sulphurous acid solution for a sufficient time to soften the protein and other non-starchy constituents, grinding the mixture of cereal and sulphurous acid and drying this mixture to remove most of the sulphurous acid but retaining a small portion thereof in the cereal for subsequent action, adding a protein satisfying agent as herein defined and a starch conversion accelerating agent and heating the thus formed mixture, whereby said retained sulphurous acid acts to inhibit the formation of gels normally produced by the protein and other non-starchy components of the cereal under these conditions and said protein satisfying agent acts to conserve the starch conversion accelerating agent and thereby increase its conversion efficiency.

2. The method of converting starch in cereal containing starchy and protein ingredients comprising degerminating the cereal, steeping the degerminated cereal in a sulphurous acid solution to soften the protein and other non-starchy constituents, grinding and drying the sulphurous acid-cereal mixture to remove most of the sulphurous acid solution but retaining a relatively small portion thereof in the cereal for subsequent gel inhibiting action, adding a sulphite salt to the mixture to augment the gel inhibiting action of said retained sulphurous acid, adding one of the protein satisfying agents herein defined, adding a starch conversion accelerating agent and heating the mixture, whereby said retained sulphurous acid and sulphite salt will inhibit the formation of gels normally produced by the non-starchy components of the cereal under these conditions and said protein satisfying agent will prevent excessive absorption of the starch conversion accelerating agent by the cereal and thus increase the conversion efficiency of said agent.

3. The method of converting starch in cereals having starchy and non-starchy components comprising steeping the cereal in a sulphurous acid solution, partially drying the sulphurous acid-cereal mixture to remove the excess liquid but retaining a small portion of the sulphurous acid for subsequent reaction, adding sodium sulphite, copper chloride and hydrochloric acid and heating, whereby said retained sulphurous acid and sodium sulphite coact to prevent the formation of conversion inhibiting gels and said copper chloride acts to satisfy the attraction of the protein constituent of the cereals for the hydrochloric acid, such that conversion is rapidly effected without the formation of gels and with the minimum amount of conversion accelerating hydrochloric acid.

WALTER H. HART.